(12) United States Patent
Kaltenbach

(10) Patent No.: US 8,360,933 B2
(45) Date of Patent: Jan. 29, 2013

(54) METHOD FOR TREATMENT OF A DRIVELINE

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 279 days.

(21) Appl. No.: 12/715,615

(22) Filed: Mar. 2, 2010

(65) Prior Publication Data
US 2010/0227737 A1     Sep. 9, 2010

(30) Foreign Application Priority Data

Mar. 3, 2009   (DE) .................. 10 2009 001 295

(51) Int. Cl.
*B60W 10/18*   (2012.01)
*B60W 10/04*   (2006.01)
(52) U.S. Cl. ......................... 477/185; 477/203
(58) Field of Classification Search .............. 477/183, 477/186, 203–207, 209–210, 185
See application file for complete search history.

(56) References Cited

U.S. PATENT DOCUMENTS

| | | | |
|---|---|---|---|
| 5,700,227 A | 12/1997 | Kosik et al. | |
| 6,676,562 B1 * | 1/2004 | Bulgrien | 477/74 |
| 6,702,718 B2 * | 3/2004 | Tani et al. | 477/203 |
| 7,025,708 B2 * | 4/2006 | Rieger et al. | 477/171 |
| 7,229,383 B2 * | 6/2007 | Steen et al. | 477/74 |
| 8,007,057 B2 * | 8/2011 | Niessen | 303/191 |

FOREIGN PATENT DOCUMENTS

| | | |
|---|---|---|
| DE | 195 30 612 A1 | 2/1997 |
| DE | 102 21 835 A1 | 12/2003 |
| DE | 10 2006 003 714 A1 | 8/2007 |
| DE | 10 2007 026 264 A1 | 12/2008 |
| WO | 2007/085367 A1 | 8/2007 |

OTHER PUBLICATIONS

Machine Translation of DE 102006003714.*
Machine Translation of DE102007026264.*
Machine Translation of DE10221835.*
Machine Translation of DE 102006003714; Aug. 22, 2012.*
Machine Translation of DE102007026264; Aug. 22, 2012.*
Machine Translation of DE10221835; Aug. 22, 2012.*

* cited by examiner

*Primary Examiner* — David D Le
*Assistant Examiner* — Terry Chau
(74) *Attorney, Agent, or Firm* — Davis & Bujold, PLLC

(57) ABSTRACT

A method of operating a drivetrain of a motor vehicle such that the drivetrain comprises a drive aggregate (1), an accelerator pedal (5) and a brake pedal (6). According to the invention, when the accelerator pedal (5) and the brake pedal (6) are not actuated and the drivetrain is operated in a crawling mode, thereafter if actuation of the brake pedal (6) is then detected and such actuation is by less than a defined limit amount, a crawling torque supplied for crawling operation is reduced without calling for any auxiliary braking energy to assist with braking. In contrast, if during the crawling operation, the brake pedal (6) is actuated by more than the defined limit amount, a crawling torque supplied for crawling operation is reduced and auxiliary braking energy is also called for to assist with braking.

2 Claims, 1 Drawing Sheet

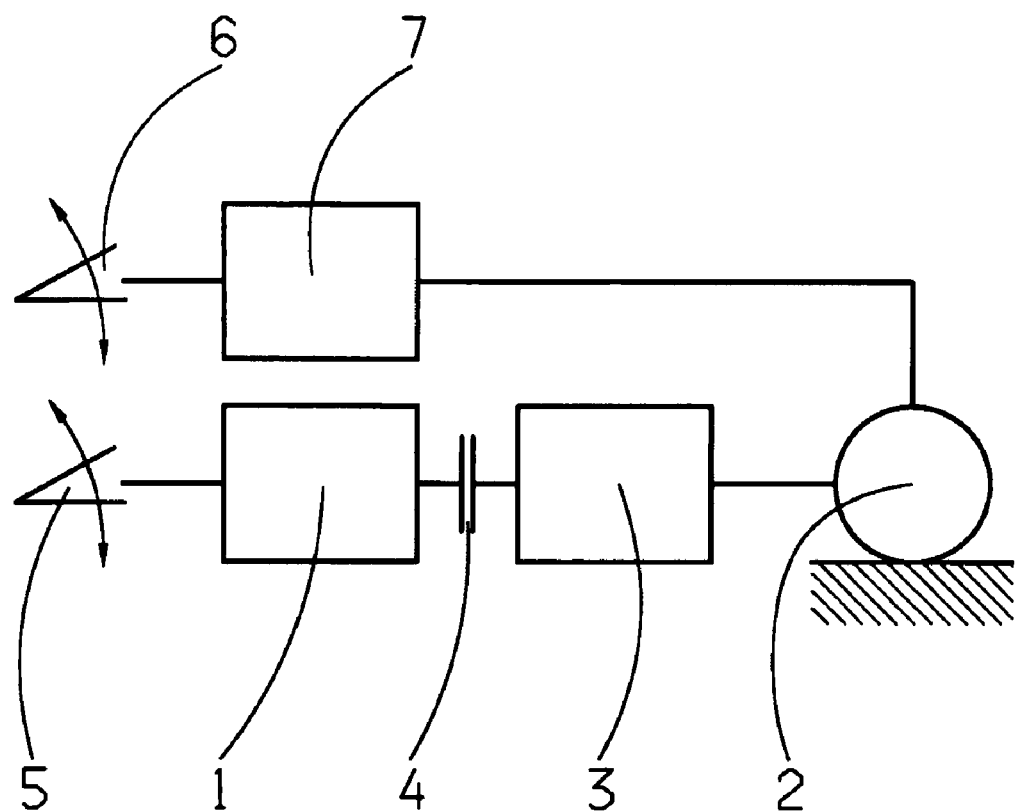

METHOD FOR TREATMENT OF A DRIVELINE

This application claims priority from German patent application serial no. 10 2009 001 295.8 filed Mar. 3, 2009.

FIELD OF THE INVENTION

The invention concerns a method for operating a drivetrain of a motor vehicle.

BACKGROUND OF THE INVENTION

The main components of a drivetrain are a drive aggregate and a transmission. The present invention concerns a method for operating a drivetrain. The method, according to the invention, can be used in a motor vehicle with a drive aggregate consisting just of an internal combustion engine, or in a purely electric vehicle whose drive aggregate is formed exclusively by an electric machine, and in a hybrid vehicle whose drivetrain is formed by an electric machine and an internal combustion engine. In a purely electric vehicle the transmission can if necessary be omitted.

It is already known from the prior art, to operate the drivetrain of a motor vehicle in a crawling mode when a gear is engaged in an automatic or automated transmission of the drivetrain and an accelerator pedal and a brake pedal of the drivetrain are not actuated, such that in this crawling mode a crawling torque is supplied which enables the motor vehicle operated in the said crawling mode to roll at a low speed. The crawling operation may be either torque-regulated or speed-regulated. From DE 10 2006 003 714 A1 a speed-regulated crawling operation mode of a drivetrain of a motor vehicle is known.

When the brake pedal is actuated during crawling operation, a brake system of the drivetrain calls for auxiliary braking energy in order to support the braking force.

Depending on the design of the brake system, the auxiliary braking energy can be pneumatic, hydraulic, electro-hydraulic or electro-mechanical energy. The amount of energy consumed is relatively large and this is a disadvantage.

SUMMARY OF THE INVENTION

Starting from there, the present invention addresses the problem of providing a new type of method for operating a drivetrain of a motor vehicle. According to the invention, an actuation of the brake pedal is detected and if, during the crawling operation, the brake pedal is actuated by less than a defined limit amount, a crawling torque supplied during the crawling operation is reduced without calling for any auxiliary braking energy to assist with braking, whereas in contrast, if during the crawling operation the brake pedal is actuated by more than a defined limit amount, a crawling torque supplied during crawling operation is reduced and auxiliary braking energy is called for to assist with braking.

With the method according to the invention, the auxiliary braking energy called for, during the crawling operation, when the brake pedal is actuated can be cut to an absolute minimum, so the energy consumption of the braking system can accordingly be reduced. The invention is based on the knowledge that when the brake pedal is actuated during the crawling operation, a deceleration desired by the driver can, as a rule because of the rolling resistance of the motor vehicle, already be produced by reducing the crawling torque, so that there is no need to call for auxiliary braking energy.

BRIEF DESCRIPTION OF THE FORMAL DRAWING

An example embodiment of the invention, to which it is not limited, is explained in more detail with reference to the drawing, which shows:

FIG. 1: A schematic drivetrain layout of a motor vehicle with which the method according to the invention can be used

DETAILED DESCRIPTION OF THE PREFERRED EMBODIMENTS

The sole FIGURE shows a greatly simplified layout of a drivetrain of a motor vehicle in which the method for operating the drivetrain, according to the invention, can be used.

The drivetrain shown very schematically in the sole FIGURE comprises a drive aggregate 1 and a transmission 3 connected between the drive aggregate 1 and a drive output 2. The drive aggregate can be just an internal combustion engine, just an electric machine, or a hybrid drive which therefore comprises both an electric machine and an internal combustion engine. A clutch 4 is connected, between the drive aggregate 1 and the transmission 3, by means of which the drive aggregate 1 can be decoupled from the drive output 2. In a purely electric vehicle, sometimes the transmission can be omitted.

The drivetrain of the sole FIGURE also comprises an accelerator pedal 5, also known as a gas pedal, such that actuation of the said accelerator pedal 5 influences the drive aggregate 1. In addition, the drivetrain of the sole FIGURE has a brake pedal 6 such that actuation of the said brake pedal 6, in particular, influences a braking system 7 of the drivetrain in such manner that when the brake pedal 6 is actuated, a braking torque is applied to the drive output 2. The braking torque applied to the drive output 2, by the braking system 7, thus depends on the actuation of the brake pedal 6 so that, depending on the actuation of the brake pedal 6, the braking system 7 supplies auxiliary braking energy in order to support the braking force.

The said auxiliary braking energy can be pneumatic, hydraulic, electro-hydraulic, electro-mechanical or some other form of auxiliary braking energy for providing the braking force.

In the drivetrain 1 of the sole FIGURE, when a gear is engaged in the transmission 3 and the accelerator pedal 5 and the brake pedal 6 are not actuated, the drivetrain operates in a crawling mode such that during this crawling operation the drive aggregate 1 supplies a crawling torque which allows the motor vehicle to roll at a low speed. This crawling operation can be either torque-regulated or speed-regulated.

In the context of the present invention, when the motor vehicle or its drivetrain are being operated in the crawling mode, an actuation of the brake pedal 6 is detected and, during crawling operation, if the brake pedal 6 is actuated by less than a defined limit amount, the crawling torque supplied is reduced, but without calling for any auxiliary braking energy to assist with braking, whereas in contrast, during the crawling operation, when the brake pedal 6 is actuated by more than a defined limit amount, the crawling torque supplied for crawling operation is reduced and auxiliary braking energy is called for to assist with braking. Thus, if the brake pedal 6 is only touched lightly during the crawling operation, only the crawling torque is reduced but no auxiliary braking energy is consumed or called for.

In a further advantageous development of the method, according to the invention, it is proposed to design the above function such that it also depends on a speed of the motor vehicle, i.e., the above function is only enabled up to a certain speed limit. In this case, therefore, during crawling operation, on the one hand, the speed of the motor vehicle and, on the other hand, the actuation of the brake pedal 6 are determined.

When the speed of the motor vehicle, during the crawling operation, is lower than a defined limit value and the brake pedal 6 is actuated by less than a defined limit amount, the crawling torque supplied during crawling operation is reduced without calling for any auxiliary braking energy to assist with braking.

During the crawling operation, when the speed of the motor vehicle is lower than the said defined limit value and the brake pedal 6 is actuated by more than a defined limit amount, the crawling torque supplied during crawling operation is reduced and auxiliary braking energy is called for to assist the braking.

In contrast, when during crawling operation of the motor vehicle its speed is higher than the defined limit value, actuation of the brake pedal 6 always results, on the one hand, in a reduction of the crawling torque supplied for crawling operation and, on the other hand, in a demand for auxiliary braking energy to assist with braking.

In all the described situations, when the brake pedal 6 is actuated the crawling torque supplied is preferably reduced to zero.

The present invention is based on the recognition that when, for example while maneuvering, a motor vehicle is being operated in a crawling mode, a deceleration desired by the driver, which he initiates by actuating the brake pedal 6, can be achieved solely by virtue of a reduction of the crawling torque supplied during crawling operation because of the rolling resistance of the motor vehicle, without the need to call for or consume auxiliary braking energy. In this way, the energy needed in order to supply the said auxiliary braking energy can be saved.

INDEXES

1 Drive aggregate
2 Drive output
3 Transmission
4 Clutch
5 Accelerator pedal
6 Brake pedal
7 Braking system

The invention claimed is:

1. A method of operating a drivetrain of a motor vehicle in which the drivetrain comprises a drive aggregate, an accelerator pedal and a brake pedal, and when the drivetrain being operated in a crawling mode and the accelerator pedal and the brake pedal being unactuated, the method comprising the steps of:

determining a speed of the motor vehicle;
if, during the crawling operation, the speed of the motor vehicle is lower than a defined limit value and the brake pedal is actuated by less than a defined limit amount, reducing the crawling torque supplied for the crawling operation without utilizing auxiliary braking energy to assist with braking of the motor vehicle;
if, during the crawling operation the speed of the motor vehicle is lower than the defined limit value but the brake pedal is actuated by more than the defined limit amount, both reducing the crawling torque supplied for the crawling operation and utilizing auxiliary braking energy to assist with braking of the motor vehicle; and
if during the crawling operation both the speed of the motor vehicle is greater than the defined limit value and the brake pedal is actuated, both reducing the crawling torque supplied for the crawling operation and calling for auxiliary braking energy to assist with braking of the motor vehicle.

2. A method of operating a drivetrain of a motor vehicle in which the drivetrain comprises a drive aggregate, an accelerator pedal and a brake pedal, and when the drivetrain being operated in a crawling mode and the accelerator pedal and the brake pedal being unactuated, the method comprising the steps of:

determining a speed of the motor vehicle;
if, during the crawling operation, the speed of the motor vehicle is lower than a defined limit value and the brake pedal is actuated by less than a defined limit amount, reducing the crawling torque supplied for the crawling operation without utilizing auxiliary braking energy to assist with braking of the motor vehicle;
if during the crawling operation the seed of the motor vehicle is lower than the defined limit value but the brake pedal is actuated by more than the defined limit amount, both reducing the crawling torque supplied for the crawling operation and utilizing auxiliary braking energy to assist with braking of the motor vehicle
reducing the crawling torque, supplied during the crawling operation, to zero whenever torque reduction results from brake pedal actuation; and
if during the crawling operation both the speed of the motor vehicle is greater than the defined limit value and the brake pedal is actuated, both reducing the crawling torque supplied for the crawling operation and calling for auxiliary braking energy to assist with braking of the motor vehicle.

* * * * *